(12) United States Patent
Nagel

(10) Patent No.: US 7,570,258 B2
(45) Date of Patent: Aug. 4, 2009

(54) METHOD FOR ADJUSTING THE SCANNING FREQUENCY AND/OR SCANNING PHASE OF A DIGITAL IMAGE REPRODUCING DEVICE

(75) Inventor: Uwe Nagel, Karlsruhe (DE)

(73) Assignee: EIZO GmbH, Karlsruhe (DE)

( * ) Notice: Subject to any disclaimer, the term of this patent is extended or adjusted under 35 U.S.C. 154(b) by 1218 days.

(21) Appl. No.: 10/743,106

(22) Filed: Dec. 23, 2003

(65) Prior Publication Data

US 2004/0165229 A1 Aug. 26, 2004

(30) Foreign Application Priority Data

Dec. 23, 2002 (DE) ................................ 102 60 595

(51) Int. Cl.
*G06F 3/038* (2006.01)
*H03L 7/00* (2006.01)
*H04L 7/00* (2006.01)

(52) U.S. Cl. ..................... 345/211; 348/537; 375/355
(58) Field of Classification Search ................... 345/99, 345/211–213; 348/180–194, 536, 537; 375/355
See application file for complete search history.

(56) References Cited

U.S. PATENT DOCUMENTS

| | | | | |
|---|---|---|---|---|
| 4,466,014 A * | 8/1984 | Wilensky et al. | ............ | 348/183 |
| 5,990,968 A * | 11/1999 | Naka et al. | ................... | 348/537 |
| 6,404,422 B1 * | 6/2002 | Choi | ........................... | 345/211 |
| 6,597,370 B1 * | 7/2003 | Lee | .............................. | 345/660 |
| 6,734,898 B2 * | 5/2004 | Zeidler | ........................ | 348/183 |
| 7,236,163 B2 * | 6/2007 | Yoo | ............................ | 345/213 |

* cited by examiner

*Primary Examiner*—Bipin Shalwala
*Assistant Examiner*—Steven E Holton
(74) *Attorney, Agent, or Firm*—Sughrue Mion, PLLC

(57) ABSTRACT

A method for adjusting the scanning frequency and/or the scanning phase of an analog/digital converter (3) of an image-reproducing device that has a digitally controlled display (1) for displaying an image of a predefined number of lines and a predefined number of pixels per line. The digitally controlled display receives digital image data from the analog/digital converter (3). The analog/digital converter generates the digital image data by scanning with a scanning signal that has the scanning frequency and the scanning phase of an analog video signal (6a). Therein, the analog video signal (6a) is applied to the image-reproducing device, and the digital image data is buffered in an image memory (2). The digital image data is compared with predefined data that correspond to the analog video signal, and the scanning frequency is adjusted until a comparison of the data provides a sufficient match. An associated device has an image generator (6) for generating the analog video signal (6a) and a memory (5) for storing the predefined data for comparison with the digital image data.

10 Claims, 1 Drawing Sheet

1 Display
2 Image Memory
3 Analog/Digital Converter
4 Processor
5 Comparison Data Memory
6 Image Generator
7 Personal Computer 1 Display
2 Image Memory
3 Analog/Digital Converter
4 Processor
5 Comparison Data Memory
6 Image Generator
7 Personal Computer

METHOD FOR ADJUSTING THE SCANNING FREQUENCY AND/OR SCANNING PHASE OF A DIGITAL IMAGE REPRODUCING DEVICE

The following disclosure is based on German Patent Application No. 10260595.5, filed on Dec. 23, 2002, which is incorporated into this application by reference.

FIELD OF AND BACKGROUND OF THE INVENTION

The invention relates to a method and an arrangement for adjusting the scanning frequency and/or scanning phase of an analog/digital converter of an image reproducing device. This image reproducing device has a digitally controlled display for displaying an image of a predefined number of lines and a predefined number of pixels per line. Therein, the image reproducing device receives digital image data from the analog/digital converter. The analog/digital converter generates the digital image data by scanning an analog video signal, which is applied to the image reproducing device, using a scanning signal of the scanning frequency and the scanning phase. Therein, the digital image data are buffered in an image memory.

To reproduce an image on the screen of a monitor tube, the video signal must be in analog form. As a result, in particular in personal computers, analog video signals must be generated if the respective images are to be reproduced on a monitor tube. The increasingly common flat screens, however, such as LC, OLED or plasma displays, which have fixed pixels that form a matrix, require a digital signal for their control. As a result, a video signal that is present in analog form must be converted into a digital signal so as to display an image on a flat screen.

The conversion of the analog signal into a digital signal regularly takes place in an analog/digital converter, in which the analog video signal is scanned using a scanning signal of a specific scanning frequency and scanning phase. It is important for the quality of the representation of an analog video signal on a flat screen, that the phase and the frequency of the scanning signal are optimally adjusted.

Due to the many different forms of analog video signals, it is almost impossible to preset the optimal frequency and phase of the scanning signal. Therefore, the adjustment of the optimal frequency and phase must take place when the image is reproduced. The result of the adjustment, however, strongly depends on the content of the image to be reproduced on the flat screen.

Conventional methods for automatically adjusting the scanning frequency do not ensure that the adjustment is performed with suitable images.

OBJECTS OF THE INVENTION

It is one object of the invention to provide a method and an arrangement such that the scanning frequency of an analog/digital converter of an image reproducing device is readily adjustable. Therein, the image reproducing device has a digitally controlled display for displaying an image that has a predefined number of lines and a predefined number of pixels per line.

SUMMARY OF THE INVENTION

According to one formulation of the present invention, this and other objects are achieved by a method for adjusting the scanning frequency and/or the scanning phase of an analog/digital converter of an image-reproducing device. The image-reproducing device is equipped with a digitally controlled display for displaying an image that has a predefined number of lines and a predefined number of pixels per line. This digitally controlled display receives its digital image data from the analog/digital converter. The analog/digital converter generates the digital image data by scanning with a scanning signal, which has a scanning frequency and a scanning phase of an analog video signal that is applied to the image-reproducing device. The digital image data are buffered in an image memory. A predefined video signal is applied to the image-reproducing device, and the digital image data that are buffered in the image memory are compared with predefined data that correspond to the predefined video signal. The scanning frequency is adjusted until the comparison of the data results in a sufficient match.

Applying a predefined video signal to the image-reproducing device has the advantage that it is predictable how the digital image data buffered in the image memory have to be configured. Thus, by comparing the digital image data buffered in the image memory with predefined data that correspond to the predefined video signal, it is possible to determine whether the scanning frequency used to scan the predefined video signal is correct or optimal. If this comparison shows that the data does not match, or does not sufficiently match, the scanning frequency is adjusted until the comparison of the data shows a sufficient match.

Thus, the predefined video signal that is applied to the image-reproducing device can be used to make a specific correction in the scanning frequency, if necessary. It is particularly easy to check and, where applicable, correct the scanning frequency, if the predefined video signal corresponds to a test image that has a regular pattern in horizontal direction. Therein, in an exemplary embodiment of the invention, a marking is provided in the area of the right edge of the test image. The regular pattern greatly simplifies the comparison according to the invention. The marking in the right edge area of the test image makes it easy to find the end of a line, so that the image data at the end of a line can be specifically compared. Since the error caused by an incorrectly adjusted scanning frequency is especially large at the end of the line due to cumulation, comparing the image data at the end of the line enables a very fine correction of the scanning frequency. In a particularly advantageous embodiment, the marking forms the end of a line because it enables the end of the line to be reliably detected, which simplifies the comparison.

In another particularly advantageous embodiment of the invention, the pattern is formed in that the pixels in a line have alternating and different brightness values, and in that the marking has several pixels with the same brightness. Such a pattern is particularly easy to evaluate because the image content is very simple but provides nevertheless enough information to carry out the method according to the invention.

In this latter embodiment, it is particularly advantageous if the brightness values differ by a maximum possible value. In practice, this means that the brightness values of the pixels alternately correspond to a minimum white level and a maximum white level or a black level. This makes it particularly easy to determine the pixel boundaries.

In another exemplary embodiment of the invention, the test image is adapted to the resolution, which is determined by the respective number of lines and pixels per line set for the display. This makes it possible to automatically carry out the method according to the invention for differently sized flat screens.

In a particularly advantageous embodiment of the invention, a predefined number of successive pixels of a line of the test image is checked for a match with the predefined data. To minimize the effects of a possibly large deviation of the scanning frequency from the optimal scanning frequency, it is particularly advantageous to check the first pixels of a line of the test image for a match with the predefined data. If this check shows, for example, that the first ten pixels of a line of the test image match the first ten pixels of the predefined data, then the scanning frequency is substantially correctly adjusted. If the comparison does not result in a match, then the scanning frequency must be adjusted until a match is obtained.

In another exemplary embodiment of the invention, prior to checking the predefined number of successive pixels of a line of the test image for a match with the predefined data, the brightness value for a pixel detected by the scanning signal is measured, the phase of the scanning signal is increased until the brightness value of the pixel changes, the original phase is reset and subsequently reduced until the brightness of the pixel changes again, and the phase is adjusted to correspond to the mean or average value of the two boundary values. As a result, the scanning occurs precisely in the center of the pixel, such that a minor shift of the scanning frequency does not cause the scanning signal to scan a different pixel.

In yet another advantageous embodiment, if checking the first pixels shows that the scanning frequency is adjusted substantially correctly, then the marking in the end area of the line is checked for a match with the predefined data. The cumulation of any error that is present as a result of an incorrect scanning frequency makes it easy to recognize a frequency deviation at the end of the line, so that a fine adjustment of the scanning frequency can be performed.

Advantageously, in another exemplary embodiment of the invention, if the respective pixels of the test image match the predefined data, a further fine adjustment of the scanning frequency is made by increasing and decreasing the phase of the scanning signal by approximately one quarter of the adjustment range that is defined by the two boundary values. Therein, if the respectively measured brightness value of a pixel changes, the scanning frequency is adjusted.

According to another formulation of the present invention, this and other objects are achieved by a device for adjusting the scanning frequency and/or the scanning phase of an analog/digital converter of an image-reproducing device. Therein, the image-reproducing device has a digitally controlled display for displaying an image of a predefined number of lines and a predefined number of pixels per line. This digitally controlled display receives digital image data from the analog/digital converter. The analog/digital converter generates the digital image data by scanning with a scanning signal that has a scanning frequency and scanning phase of an analog video signal that is applied to the image-reproducing device. The digital image data are buffered in an image memory, and a display generator generates a predefined video signal, which is applied to the image-reproducing device and converted into digital image data. A comparison data memory stores predefined data for comparison with the digital image data.

Due to the image generator for generating a predefined video signal, which is applied to the image-reproducing device and converted into digital image data, a test image is generated in an easy manner, which is required for carrying out the method according to the invention. The test image can be generated, for example, in a personal computer that has suitable software. The test image can also be produced using corresponding hardware components.

Due to the comparison data memory, which stores predefined data so as to be able to compare the predefined data with the digital image data, the test image can be evaluated in a simple manner. The predefined data can be stored as image data in the form of a matrix. The predefined data can also be stored in the form of an algorithm that makes the respectively required predefined data available.

BRIEF DESCRIPTION OF THE DRAWINGS

Further details, features and advantages of the present invention will now be described, by way of example, with reference to an exemplary embodiment depicted in the drawings, in which.

DETAILED DESCRIPTION OF THE PREFERRED EMBODIMENTS

Figure 1:
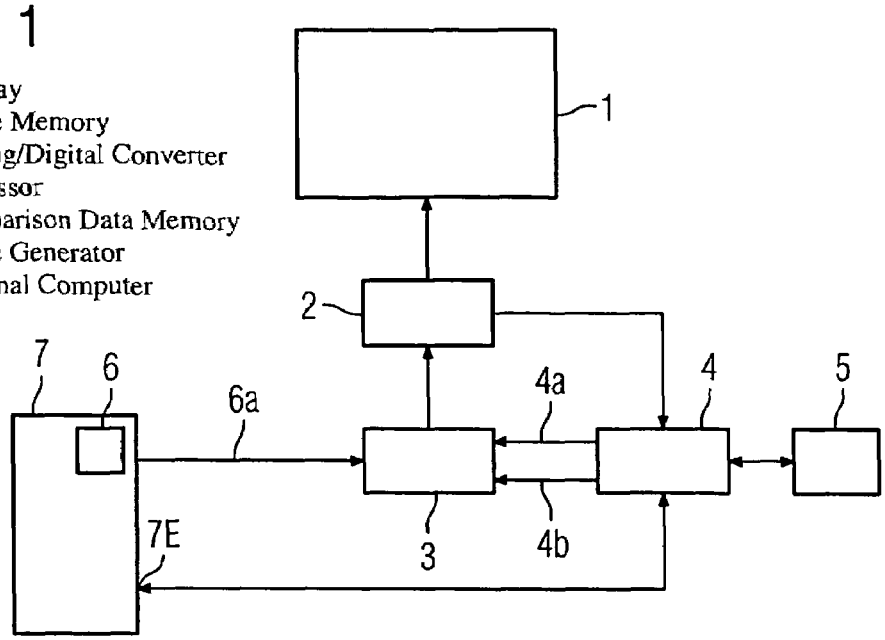
FIG. 1 shows a schematic representation of an exemplary arrangement or device according to the invention.

As shown in FIG. 1, an image memory 2 supplies image data to a display 1, which has digitally controlled pixels that are arranged in a matrix. The digital image data are buffered in the image memory 2. Therein, the image data are formed in an analog/digital converter 3 from a predefined analog video signal 6a, which corresponds to a test image 8 (see FIG. 2).

The analog/digital converter 3 is connected to a processor 4, which supplies the analog/digital converter 3 with a first signal 4a for adjusting the scanning frequency of the analog/digital converter 3, and with a second signal 4b for adjusting the phase of the scanning signal. The processor 4 is connected to the image memory 2, such that the processor 4 can read the digital image data that are buffered in the image memory 2. The processor 4 is also connected to a comparison data memory 5, from which the processor 4 can read data and into which the processor 4 can write data.

The processor 4 receives the data that are written into the comparison data memory 5 from a personal computer 7, with which the processor 4 is connected via a communications interface 7E. The digital data written into the comparison data memory 5 correspond to the test image 8, which is generated in an image generator 6 of the personal computer 7. As previously mentioned, the analog video signal 6a of the test image 8 is applied to the analog/digital converter 3.

Figure 2:
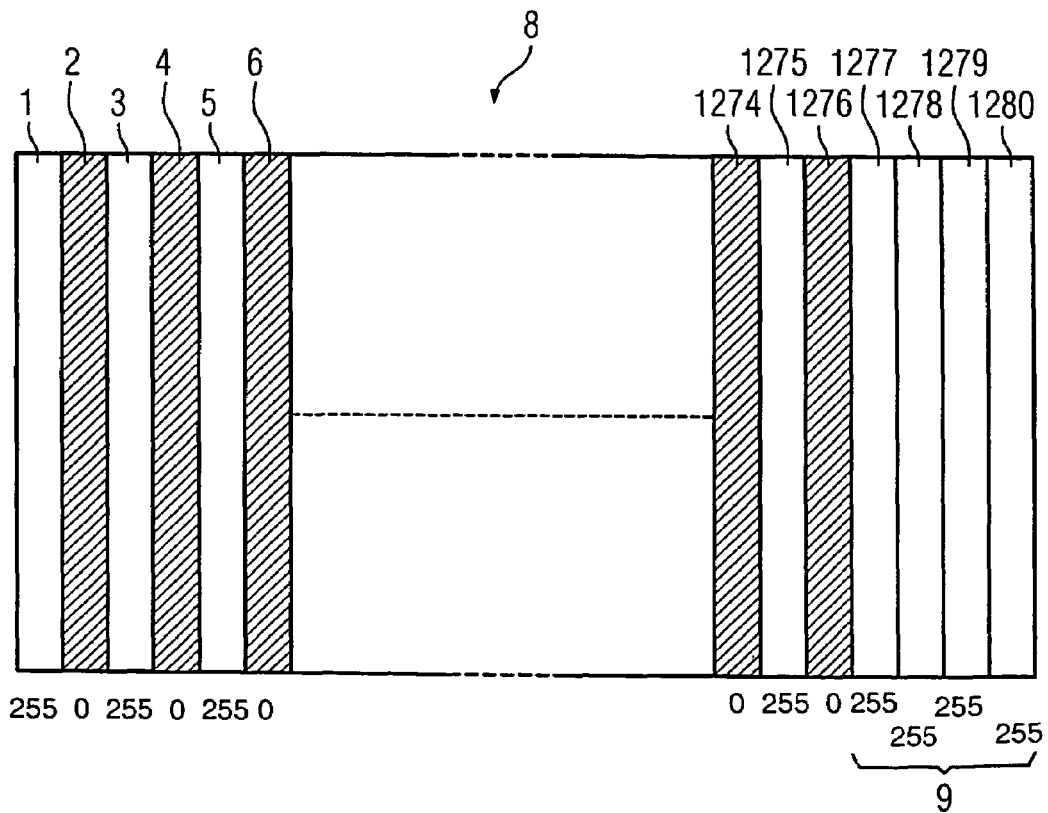
FIG. 2 shows a test image.

The basic structure of the test image 8 is illustrated in FIG. 2. The test image 8 has alternating white and black bars. In the case of an 8-bit converter and under optimal conditions, the brightness value of a white bar is 255, whereas the brightness value of a black bar is 0. The test image has 1280 bars, such that, for a resolution of 1280 by 1024, the width of a bar corresponds to one pixel. However, at the right edge of the test image 8, four consecutive white bars 9 are arranged so that each of the last four pixels of a line has a brightness value of 255. This allows for very precise determination of the end of a line.

The test image 8 generated by the image generator 6 is adapted to the size of the display 1. As soon as the video signal 6a is applied to the analog/digital converter 3, and as soon as the processor 4 receives the corresponding digital image data via the communications interface 7E and writes them into the comparison data memory 5, the processor 4 starts a matching procedure.

Therein, the processor 4 determines the first pixel of a line of the digital image data of the test image, which is buffered in the image memory 2. Since the brightness value of this pixel corresponds to a white level or white value, this value, in the case of an 8-bit converter, is 255. Therefore, this pixel should be easy to find. Once the first pixel has been found, in order to adjust the phase of the analog/digital converter 3, the second signal 4b of the processor 4 is increased until the scanned brightness value is reduced. The corresponding value of the output signal 4b of the processor 4 is buffered in the processor 4. Thereafter, the value of the second output signal 4b of the processor 4 is reduced until the brightness value of the pixel becomes smaller again. By forming the average value of the current value and the previously stored value, the optimum adjustment (center position) of the phase of the scanning signal is obtained.

After the phase of the scanning signal has been adjusted to its average value or mean value, the next nine pixels are scanned. In the case of an 8-bit converter, the following values should result for the first ten pixels, if the scanning frequency is adjusted approximately correctly: 255, 0, 255, 0, 255, 0, 255, 0, 255, 0. However, since the brightness values are not always optimal, slightly different values may result, e.g.: 250, 4, 248, 6, 246, 3, 253, 5, 252, 2. If this check produces different values, then the scanning frequency must be adjusted until these values are obtained.

Since the structure of the test image 8 and the resolution used for the test image 8 are known, the position of the last white pixels of a respective line in the image memory 2 can be determined quite precisely. If the scanning of these pixels results in the brightness values of 255, then the scanning frequency is nearly optimal.

To ensure that a light pixel is not just accidentally located in the last position of the line, the last six adjacent pixels are checked for their correct values. If this check shows that the last six pixels of a line have the brightness values 255, 0, 255, 255, 255, 255, then the scanning frequency is adjusted correctly. If the check shows that the last six pixels have the brightness values 0, 255, 255, 255, 255, 0, then the scanning frequency is slightly too low. If the check shows that the last six pixels have the brightness values 0, 255, 0, 255, 255, 255, or 255, 0, 255, 0, 255, 255, the scanning frequency is slightly too high. Thus, the deviation of the actual scanning frequency from the correct scanning frequency can be calculated and easily corrected.

If the above checks showed that the scanning frequency is correct, then, if necessary, the phase of the scanning signal can be further optimized so as to ensure a scanning reserve. Therein, the phase is increased and decreased by one quarter of the range for the optimal adjustment of the phase (the difference between the two determined values). If the scanned pattern is maintained, the frequency and phase of the scanning signal are optimally adjusted. If there are deviations, the frequency can still be slightly adjusted, if the resolution is high enough. If the frequency had to be corrected, there should be a final check of the phase adjustment at the first pixel of this line.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A method for adjusting at least one of a scanning frequency and a scanning phase of an analog/digital converter of an image-reproducing device, wherein the image-reproducing device has a digitally controlled display for displaying an image of a predefined number of lines and a predefined number of pixels per line; wherein the digitally controlled display receives digital image data from the analog/digital converter; wherein the analog/digital converter generates the digital image data by scanning with a scanning signal having the scanning frequency and the scanning phase of a predefined analog video signal; and wherein the digital image data is buffered in an image memory; the method comprising:

applying the predefined analog video signal to the image-reproducing device;

comparing the digital image data buffered in the image memory with predefined data that corresponds to the predefined analog video signal;

changing the scanning frequency until the comparison of the digital image data with the predefined data results in a predetermined match;

detecting a respective brightness value in a pixel by means of the scanning signal;

measuring the respective brightness value;

increasing the scanning phase of the scanning signal until the brightness value of the pixel changes so as to determine a first boundary value;

resetting an original phase;

subsequently decreasing the original phase until the brightness value of the pixel changes again so as to determine a second boundary value; and adjusting the scanning phase of the scanning signal so as to correspond to an average value of the first and second boundary values, wherein a predetermined number of consecutive pixels of a line of the test image is checked for a match with the predefined data.

2. The method according to claim 1, wherein the analog video signal corresponds to a test image that has a regular pattern in horizontal direction; and wherein a marking is provided in an area of a right edge of the test image.

3. The method according to claim 2, wherein the regular pattern comprises pixels in a line that have alternating, different brightness values; and wherein the marking comprises a plurality of equally bright pixels.

4. The method according to claim 3, wherein the brightness values differ by a predetermined maximum value.

5. The method according to claim 4, wherein the test image is adapted to a resolution, which is determined by the predefined number of lines and the predefined number of pixels per line that are set for the digitally controlled display.

6. The method according to claim 2, wherein the marking is checked for a match with the predefined data.

7. The method according to claim 1, further comprising:

if a match is determined between respective pixels of the test image and the predefined data, respectively increasing and decreasing the scanning phase of the scanning signal by approximately one quarter of a range that is determined by the first boundary value and the second boundary value; and adjusting the scanning frequency, if a change in the respectively measured brightness value of a pixel occurs.

8. A method, comprising:

applying a predefined analog video signal to an image-reproducing device;

comparing digital image data that are buffered in an image memory with predefined data that corresponds to the predefined analog video signal;

changing a scanning frequency until the comparison of the digital image data with the predefined data results in a predetermined match, detecting a respective brightness value in a pixel by means of the scanning signal;

measuring the respective brightness value;

increasing a scanning phase of a scanning signal until the brightness value of the pixel changes so as to determine a first boundary value;

resetting an original phase;

subsequently decreasing the original phase until the brightness value of the pixel changes again so as to determine a second boundary value; and adjusting the scanning phase of the scanning signal so as to correspond to an average value of the first and second boundary values, wherein a predetermined number of consecutive pixels of a line of a test image is checked for a match with the predefined data.

9. A device for adjusting at least one of a scanning frequency and a scanning phase of an analog/digital converter of an image-reproducing device, wherein the image-reproducing device has a digitally controlled display configured to display an image of a predefined number of lines and a predefined number of pixels per line; wherein the digitally controlled display is configured to receive digital image data from the analog/digital converter; wherein the analog/digital converter is configured to generate the digital image data by scanning with a scanning signal having the scanning frequency and the scanning phase of a predefined analog video signal; and wherein the digital image data is buffered in an image memory, the device comprising:

an image generator configured to generate the predefined analog video signal, which is applied to the image-reproducing device and converted into the digital image data;

a memory configured to store predefined data for comparison with the digital image data; and a processor configured to detect a respective brightness value in a pixel by means of the scanning signal;

measure the respective brightness value;

increase the scanning phase of the scanning signal until the brightness value of the pixel changes so as to determine a first boundary value;

reset an original phase;

subsequently decrease the original phase until the brightness value of the pixel changes again so as to determine a second boundary value; and adjust the scanning phase of the scanning signal so as to correspond to an average value of the first and second boundary values, wherein a predetermined number of consecutive pixels of a line of a test image is checked for a match with the predefined data, and wherein the predefined data stored in the memory corresponds to the predefined analog video signal.

10. A device, comprising:

an image generator configured to generate a predefined analog video signal, which is applied to an image-reproducing device and converted into digital image data;

a memory configured to store predefined data for comparison with the digital image data; and a processor configured to detect a respective brightness value in a pixel by means of the scanning signal;

measure the respective brightness value;

increase a scanning phase of a scanning signal until the brightness value of the pixel changes so as to determine a first boundary value;

reset an original phase;

subsequently decrease the original phase until the brightness value of the pixel changes again so as to determine a second boundary value; and adjust the scanning phase of the scanning signal so as to correspond to an average value of the first and second boundary values, wherein a predetermined number of consecutive pixels of a line of a test image is checked for a match with the predefined data, and wherein the predefined data stored in the memory corresponds to the predefined analog video signal.

* * * * *